United States Patent
Papasakellariou et al.

(10) Patent No.: US 9,281,863 B2
(45) Date of Patent: Mar. 8, 2016

(54) APPLICATION OF SEQUENCE HOPPING AND ORTHOGONAL COVERING CODES TO UPLINK REFERENCE SIGNALS

(71) Applicant: Samsung Electronics Co., Ltd., Geyonggi-do (KR)

(72) Inventors: Aris Papasakellariou, Dallas, TX (US); Joon Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/622,231

(22) Filed: Feb. 13, 2015

(65) Prior Publication Data

US 2015/0162951 A1    Jun. 11, 2015

Related U.S. Application Data

(63) Continuation of application No. 14/500,095, filed on Sep. 29, 2014, which is a continuation of application No. 13/920,754, filed on Jun. 18, 2013, now Pat. No. 8,848,761, which is a continuation of application No.

(Continued)

(51) Int. Cl.
*H04W 72/04* (2009.01)
*H04B 1/707* (2011.01)

(Continued)

(52) U.S. Cl.
CPC .......... *H04B 1/70718* (2013.01); *H04B 1/707* (2013.01); *H04B 7/0452* (2013.01);

(Continued)

(58) Field of Classification Search
CPC ... H04B 7/0452; H04B 7/0048; H04J 13/004; H04J 13/0074; H04L 27/2613; H04L 27/2602; H04W 72/0413; H04W 88/06; H04W 72/042
See application file for complete search history.

(56) References Cited

U.S. PATENT DOCUMENTS 5,983,113 A    11/1999   Asanuma
8,848,761 B2    9/2014   Papasakellariou et al.

(Continued)

FOREIGN PATENT DOCUMENTS

CN    101465720    6/2009
EP    2 056 515    5/2009

(Continued)

OTHER PUBLICATIONS

Love, R. and Nangia, V. (2009) Uplink Reference Signals, in LTE—The UMTS Long Term Evolution: From Theory to Practice (eds S. Sesia, I. Toufik and M. Baker), Chapter 16, John Wiley & Sons, Ltd, Chichester, UK, pp. 359-375.*

(Continued)

*Primary Examiner* — Chieh M Fan
*Assistant Examiner* — Michelle M Koeth
(74) *Attorney, Agent, or Firm* — The Farrell Law Firm, P.C.

(57) ABSTRACT

Methods and apparatuses are provided for transmitting and receiving references signals. A method includes receiving first and second cell specific parameters; receiving a third UE specific parameter; acquiring a first reference signal for a PUSCH, based on the third parameter; acquiring a second reference signal for a PUCCH, based on the first parameter; and transmitting at least one of the first reference signal and the second reference signal. Sequence hopping and group sequence hopping are disabled for the first reference signal, regardless of values of the first parameter and the second parameter, if the third parameter indicates that the sequence hopping and the group sequence hopping are disabled. The group sequence hopping is applied to acquire the second reference signal, if the first parameter indicates that the group sequence hopping is enabled and the third parameter indicates that the sequence hopping and the group sequence hopping are disabled.

16 Claims, 10 Drawing Sheets

Related U.S. Application Data

13/032,257, filed on Feb. 22, 2011, now Pat. No. 8,483,258.

(60) Provisional application No. 61/306,753, filed on Feb. 22, 2010.

(51) Int. Cl.

| | |
|---|---|
| *H04L 27/26* | (2006.01) |
| *H04L 5/00* | (2006.01) |
| *H04B 7/04* | (2006.01) |
| *H04L 5/06* | (2006.01) |
| *H04J 13/00* | (2011.01) |
| *H04L 1/00* | (2006.01) |
| *H04L 1/18* | (2006.01) |
| *H04W 88/02* | (2009.01) |
| *H04W 88/08* | (2009.01) |

(52) U.S. Cl.
CPC ......... *H04J13/004* (2013.01); *H04J 13/0074* (2013.01); *H04L 5/0016* (2013.01); *H04L 5/0048* (2013.01); *H04L 5/0051* (2013.01); *H04L 27/2602* (2013.01); *H04L 27/2613* (2013.01); *H04W 72/042* (2013.01); *H04W 72/0413* (2013.01); *H04J 13/0048* (2013.01); *H04J 13/0062* (2013.01); *H04L 1/0067* (2013.01); *H04L 1/1812* (2013.01); *H04L 5/0023* (2013.01); *H04W 88/02* (2013.01); *H04W 88/08* (2013.01)

(56) References Cited

U.S. PATENT DOCUMENTS

| | | | |
|---|---|---|---|
| 2008/0165893 A1 | 7/2008 | Malladi et al. | |
| 2008/0310540 A1 | 12/2008 | Tiirola et al. | |
| 2009/0046645 A1 | 2/2009 | Bertrand et al. | |
| 2009/0060004 A1 | 3/2009 | Papasakellariou et al. | |
| 2009/0080500 A1 | 3/2009 | Muharemovic et al. | |
| 2009/0249027 A1* | 10/2009 | Kim et al. | 712/5 |
| 2010/0062783 A1 | 3/2010 | Luo et al. | |
| 2010/0177695 A1* | 7/2010 | Ji et al. | 370/328 |
| 2010/0272022 A1 | 10/2010 | Iwai et al. | |
| 2011/0141928 A1 | 6/2011 | Shin et al. | |
| 2011/0142107 A1* | 6/2011 | Pan et al. | 375/219 |
| 2011/0150120 A1 | 6/2011 | Hooli et al. | |
| 2011/0235597 A1* | 9/2011 | Montojo et al. | 370/329 |
| 2012/0014318 A1* | 1/2012 | Luo et al. | 370/328 |
| 2012/0201275 A1 | 8/2012 | Tiirola et al. | |
| 2012/0213146 A1* | 8/2012 | Liu et al. | 370/312 |
| 2012/0250663 A1 | 10/2012 | Han et al. | |
| 2012/0257531 A1 | 10/2012 | Ko et al. | |
| 2013/0121266 A1 | 5/2013 | Ko et al. | |

FOREIGN PATENT DOCUMENTS

| | | |
|---|---|---|
| EP | 2 523 378 | 11/2012 |
| WO | WO 2008/132073 | 11/2008 |
| WO | WO 2009/084224 | 7/2009 |
| WO | WO 2009/120828 | 10/2009 |

OTHER PUBLICATIONS

3GPP TS 36.211, v9.0.0 (Dec. 2009), Evolved Universal Terrestrial Radio Access (E-UTRA) physical channels and modulation (Release 8), Dec. 2009, pp. 1-85.*

Motorola, "R1-100197: Further Views on LTE-A Uplink DM RS," 3GPP RAN WG1 #59bis, Jan. 18, 2010, Valencia, Spain, pp. 1-7.*

Huawei, "Analysis and Evaluation of UL DM RS Design for LTE-A Scenarios," 3GPP TSG RAN WG1 Meeting #59bis, R1-100262, Jan. 18-22, 2010.*

Lu et al., "CAZAC Sequence Hopping for Physical Uplink Control Channel of LTE," IEEE, 2008, pp. 1-5.*

Lu et al., "CAZAC Sequence Hopping for Physical Uplink Control Channel of LTE", IEEE, 2008, pp. 1-5.

3GPP TS 36.211 Version 8.7.0 Rel. 8, 2009, LTE; Evolved Universal Terrestrial Radio Access (E-UTRA); Physical Channels and Modulation, pp. 11-45.

U.S. Office Action dated Apr. 21, 2015 issued in counterpart U.S. Appl. No. 14/500,095.

Huawei, "Analysis and Evaluation of UL DM RS Design for LTE-A Scenarios", 3GPTT TSG RAN WGI Meeting #59bis, RI-100262, Jan. 18-22, 2010.

Pantech, "Considerations on Uplink DM-RS Sequence in LTE-Advanced", 3GPP TSG RAN WG1 Meeting #59-bis, RI-100668, Jan. 18-22, 2010.

Motorola, "RI-100197: Further Views on LTE-A Uplink DYI RS", 3GPP RAN WG1 #59bis, Jan. 18-22, 2010.

Catt, "Important Issues Concerning CSI-RS for both FDD and TDD", 3GPP TSG RAN WG1 Meeting #59, R1-094547, Nov. 9-13, 2009.

English Translation of U.S. Appl. No. 61/292,868, filed Jan. 7, 2010, parent application to cited child US 2013/0121266 A1.

Samsung, "UL DMRS Aspects in Rel.10", R1-101187, 3GPP TSG RAN WG1 #60, Feb. 22-26, 2010.

Nokia Siemens Networks, "Cyclic-Shift Hopping and DM RS Signaling", R1-080294, 3GPP TSG RAN WG1 Meeting #51bis, Jan. 14-18, 2008.

Samsung, "Summary of Reflector Discussions on EUTRA UL RS", R1-080020, 3GPP TSG RAN WG1 #51bis, Jan. 14-18, 2008.

Panasonic, "Further Consideration on Uplink RS Hopping and Grouping", R1-073627, 3GPP TSG RAN WG1 Meeting #50, Aug. 20-24, 2007.

Samsung, "UL DM RS Aspects in Rel.10", R1-100132, 3GPP TSG RAN WG1 #59bis, Jan. 19-23, 2010.

Samsung, "UL DMRS Aspects in Rel.10", R1-102213, 3GPP TSG RAN WG1 #60bis, Apr. 12-16, 2010.

Samsung, "UL DMRS Aspects in Rel.10", R1-103038, 3GPP TSG RAN WG1 #61, May 10-14, 2010.

Samsung, "Clarification on Mapping of Cyclic Shift Field in DCI Format 0", R1-082302, 3GPP TSG-RAN Working Group 1 #53bis, Jun. 30-Jul. 4, 2008.

Japanese Office Action dated Feb. 2, 2015 issued in counterpart application No. 2012-554898.

Chinese Office Action dated Mar. 25, 2015 issued in counterpart application No. 201180015452.1.

U.S. Office Action dated Jul. 29, 2015 issued in counterpart U.S. Appl. No. 14/622,203, 98 pages.

* cited by examiner

APPLICATION OF SEQUENCE HOPPING AND ORTHOGONAL COVERING CODES TO UPLINK REFERENCE SIGNALS

PRIORITY

The present application is a Continuation of U.S. application Ser. No. 14/500,095, which was filed in the U.S. Patent and Trademark Office (USPTO) on Sep. 29, 2014, which is a Continuation of U.S. application Ser. No. 13/920,754, which was filed in the USPTO on Jun. 18, 2013, issued as U.S. Pat. No. 8,848,761 on Sep. 30, 2014, which is a Continuation of U.S. application Ser. No. 13/032,257, which was filed in the USPTO on Feb. 22, 2011, issued as U.S. Pat. No. 8,483,258 on Jul. 9, 2013, and claims priority under 35 U.S.C. §119(e) to U.S. Provisional Application No. 61/306,753, entitled "Applying Orthogonal Covering Codes to Uplink Reference Signals," which was filed in the USPTO on Feb. 22, 2010, the entire disclosure of each of which is incorporated herein by reference.

BACKGROUND OF THE INVENTION

1. Field of the Invention

The present invention generally relates to wireless communication systems and, more particularly, to enhancing the functionality and enabling features of reference signals transmitted from a User Equipment. The reference signals provide an estimate of the channel medium experienced by the User Equipment at a given time instance.

2. Description of the Related Art

Several types of signals need to be supported for the proper functionality of a communication system. In addition to data signals, conveying the information content, control signals also need to be transmitted from User Equipments (UEs) to their serving Base Station (BS or NodeB) in the UpLink (UL) of the communication system and from the serving NodeB to the UEs in the DownLink (DL) of the communication system to enable proper processing of the data signals. For example, control signals include positive or negative ACKnowledgement signals (ACK or NACK, respectively) that are transmitted in response to (correct or incorrect, respectively) data packet reception and are associated with a Hybrid Automatic Repeat reQuest process (HARQ-ACK signals). Control signals also include Channel Quality Indication (CQI) signals, which a UE sends to the NodeB to provide information about the DL channel conditions that the UE experiences. Further, Reference Signals (RS), also known as pilot signals, are typically transmitted to provide channel estimation and enable coherent demodulation for the transmitted data or control signals or, in the UL, to be used by the receiving NodeB to measure the UL channel conditions the UE experiences. The former RS used for demodulation of data or control signals will be referred to as DeModulation RS (DMRS) while the latter RS, which are typically wideband in nature, are used for sounding the UL channel medium and will be referred to as Sounding RS (SRS).

A UE, also commonly referred to as a terminal or a Mobile Station, may be fixed or mobile and may be a wireless device, a cellular phone, a personal computer device, and the like. A NodeB is generally a fixed station and may also be referred to as a Base Transceiver System (BTS), an access point, or similar terminology.

UEs transmit data or control information through a Physical Uplink Shared CHannel (PUSCH) while, in the absence of PUSCH transmission, the UEs transmit control information through a Physical Uplink Control CHannel (PUCCH). A UE receives the signals conveying data information through a Physical Downlink Shared CHannel (PDSCH) while signals conveying control information are received through a Physical Downlink Control CHannel (PDCCH).

Figure 1:
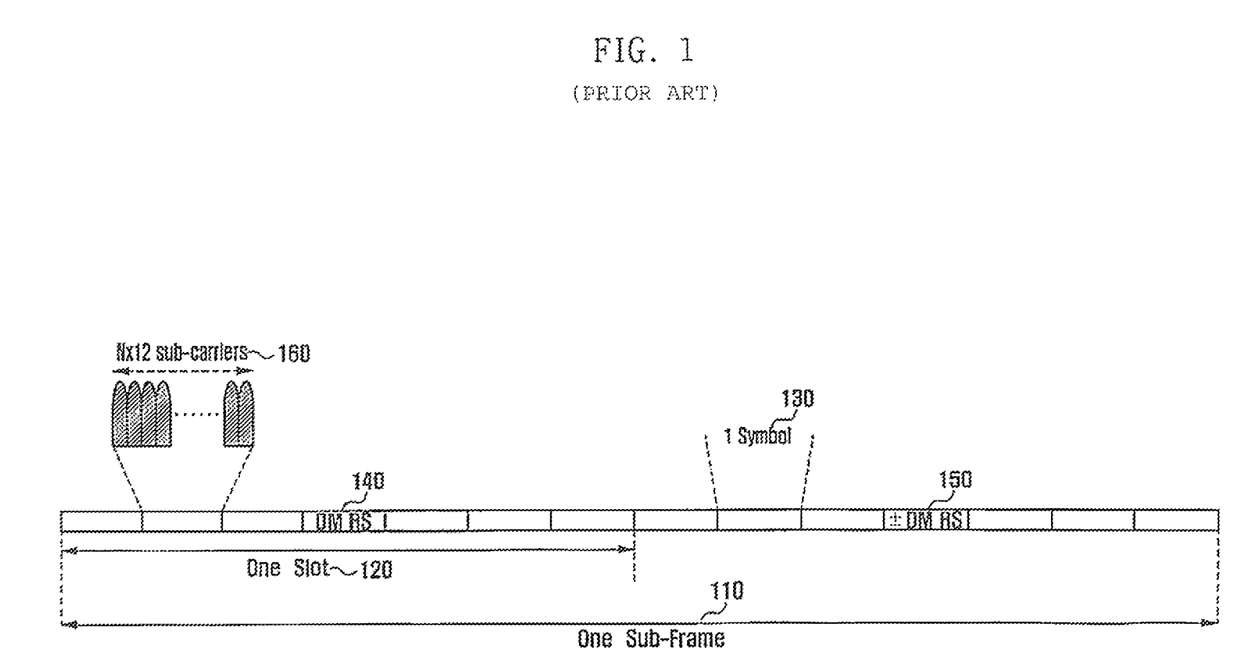
FIG. 1 is a diagram illustrating a UL sub-frame structure for PUSCH transmission in the UL of the communication system.

A UE is assumed to transmit in the PUSCH or in the PUCCH over a Transmission Time Interval (TTI), which may, for example, correspond to a sub-frame with a duration of 1 millisecond (msec). FIG. 1 illustrates a block diagram of a sub-frame structure 110 for PUSCH transmission. The sub-frame includes two slots. Each slot 120 includes seven symbols. Each symbol 130 further includes a Cyclic Prefix (CP) in order to mitigate interference due to channel propagation effects. Some symbols in each slot may be used for the DMRS transmission 140. The second DMRS in the sub-frame may or may not be transmitted with its negative value (scaled with "−1") 150 as it is subsequently described. The PUSCH transmission BandWidth (BW) consists of frequency resource units, which will be referred to as Resource Blocks (RBs). In one example, each RB includes $N_{sc}^{RB}=12$ sub-carriers, which are also referred to as Resource Elements (REs). A UE may be allocated one or more RBs 160 for PUSCH transmission and one RB for PUCCH transmission.

PUSCH transmission or PDSCH reception by a UE may be scheduled by the NodeB either dynamically, through a respective Scheduling Assignment (SA) conveying a Downlink Control Information (DCI) format in a PDCCH, or through Semi-Persistent Scheduling (SPS) using UE-specific higher layer signaling such as Radio Resource Control (RRC) signaling. The DCI format may inform a UE about a data packet transmission by the NodeB in the PDSCH (DL SA) or about a data packet transmission to the NodeB (UL SA) in the PUSCH. With SPS, a UE transmits or receives data packets at predetermined sub-frames.

Figure 2:
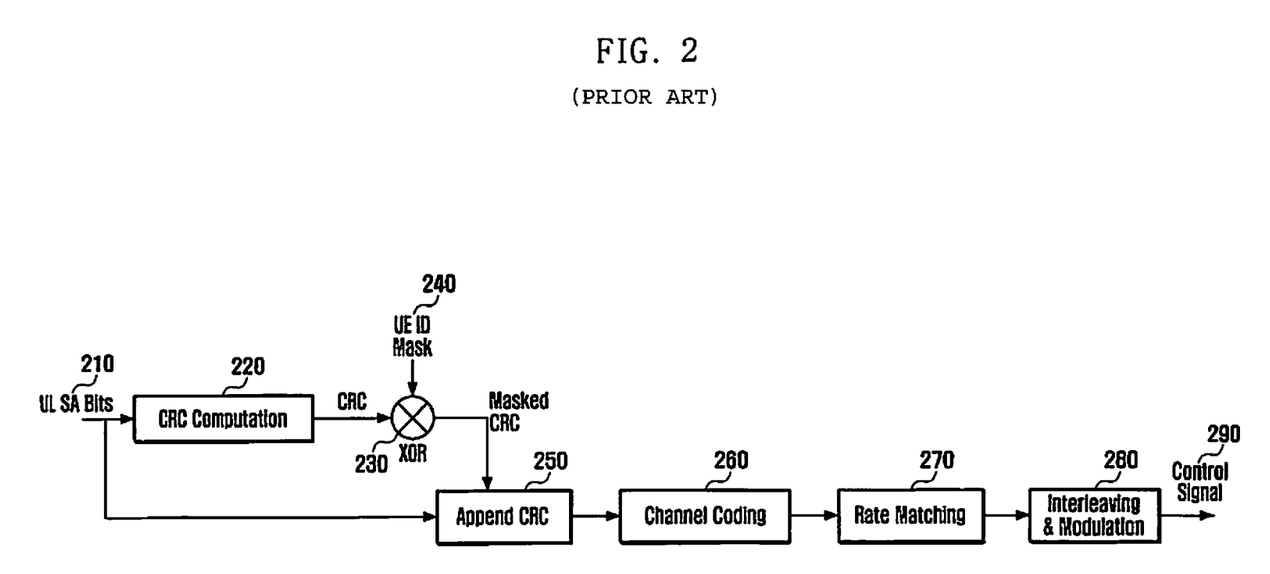
FIG. 2 is a block diagram illustrating the coding process of a SA in the NodeB.

FIG. 2 illustrates a processing chain at the NodeB for a SA transmission. The Media Access Control (MAC) layer IDentity of the UE (UE ID) for which the SA is intended for masks the Cyclic Redundancy Check (CRC) of the SA information bits in order to enable the UE to identify that the SA is intended for it. The CRC 220 of the SA information bits 210 is computed and then masked 230 using the eXclusive OR (XOR) operation between CRC bits and UE ID bits 240. An XOR operation only evaluates to true where only one of the two input bits is 1. Thus, XOR(0,0)=0, XOR(0,1)=1, XOR(1,0)=1, XOR(1,1)=0. The masked CRC is then appended to the SA information bits 250, channel coding (such as convolutional coding) is performed 260, followed by rate matching 270 to the allocated PDCCH resources, and finally by interleaving and modulation 280, and transmission of the SA 290. It is assumed that both the CRC and the UE ID have the same length such as, for example, 16 bits.

Figure 3:
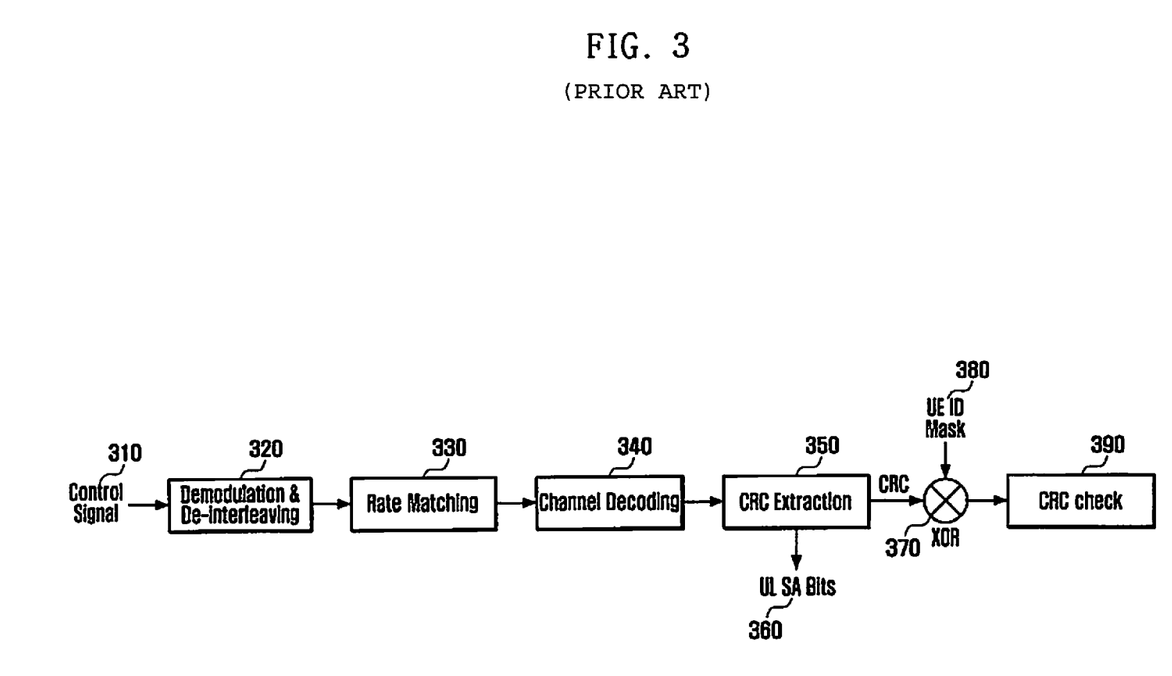
FIG. 3 is a block diagram illustrating the decoding process of a SA in the UE.

The UE receiver performs the reverse operations of the NodeB transmitter. This is illustrated in FIG. 3. The received control signal 310 is demodulated and the resulting bits are de-interleaved 320, the rate matching applied at the NodeB transmitter is restored 330 and then followed by decoding 340. The SA bits 360 are then obtained after extracting the CRC bits 350, which are then de-masked 370 by applying the XOR operation with the UE ID 380. Finally, the UE performs the CRC check 390. If the CRC check passes, the UE considers the SA as a valid one and determines the parameters for signal reception (DL SA) or signal transmission (UL SA). If the CRC check does not pass, the UE disregards the presumed SA.

The DMRS is assumed to be generated from Constant Amplitude Zero Auto-Correlation (CAZAC) sequences. An example of such a sequence is given by the following Equation (1):

$$c_k(n) = \exp\left[\frac{j2\pi k}{L}\left(n + n\frac{n+1}{2}\right)\right] \qquad \text{Eq. (1)}$$

where L is a length of the CAZAC sequence, n is an index of a sequence element, n={0, 1, 2, ..., L−1}, and k is a sequence index. For CAZAC sequences of length L, with L being a prime number, the number of sequences is L−1. Therefore, an entire family of sequences is defined as k ranges in {1, 2, ..., L−1}. However, the sequences for DMRS transmission need not be generated by strictly using the above expression. As one RB is assumed to include $N_{sc}^{RB}=12$ REs, CAZAC-based sequences can be generated either by truncating a longer prime length (such as length 13) CAZAC sequence or by extending a shorter prime length (such as length 11) CAZAC sequence by repeating its first element(s) at the end (i.e., cyclic extension), although the resulting sequences do not strictly fulfill the definition of a CAZAC sequence. Alternatively, CAZAC sequences can be generated through a computer search for sequences satisfying the CAZAC properties.

Figure 4:
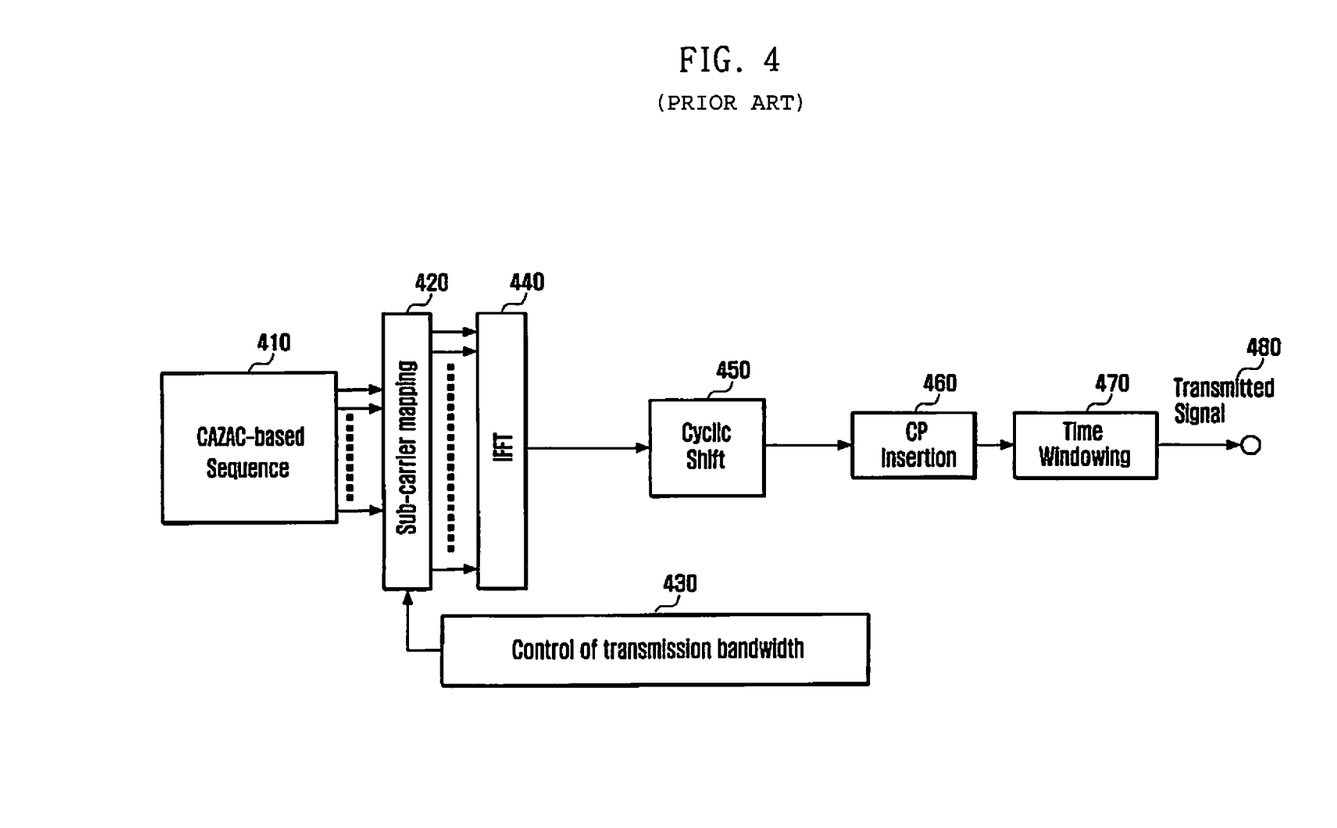
FIG. 4 is a block diagram illustrating a transmitter structure for a CAZAC-based sequence.

FIG. 4 shows a DMRS transmitter structure at a UE based on a CAZAC sequence. The frequency domain version of a CAZAC sequence may be obtained by applying a Discrete Fourier Transform (DFT) to its time domain version. The frequency domain CAZAC-based sequence 410 is generated, the REs 420 in the assigned PUSCH transmission BW are selected 430, the Inverse Fast Fourier Transform (IFFT) is performed 440, the Cyclic Shift (CS) 450 is applied, and, finally, the CP 460 and filtering 470 are applied to the transmitted signal 480. The UE also applies zero padding in REs where the DMRS is not transmitted, such as in REs used for signal transmission from another UE (not shown). The PUSCH transmission BW may be contiguous, in accordance with the SC-FDMA transmission principle, or non-contiguous in accordance with the DFT-Spread-OFDM (DFT-S-OFDM) transmission principle. For brevity, additional transmitter circuitry such as digital-to-analog converter, analog filters, amplifiers, and transmitter antennas, as they are known in the art, are not shown.

Figure 5:
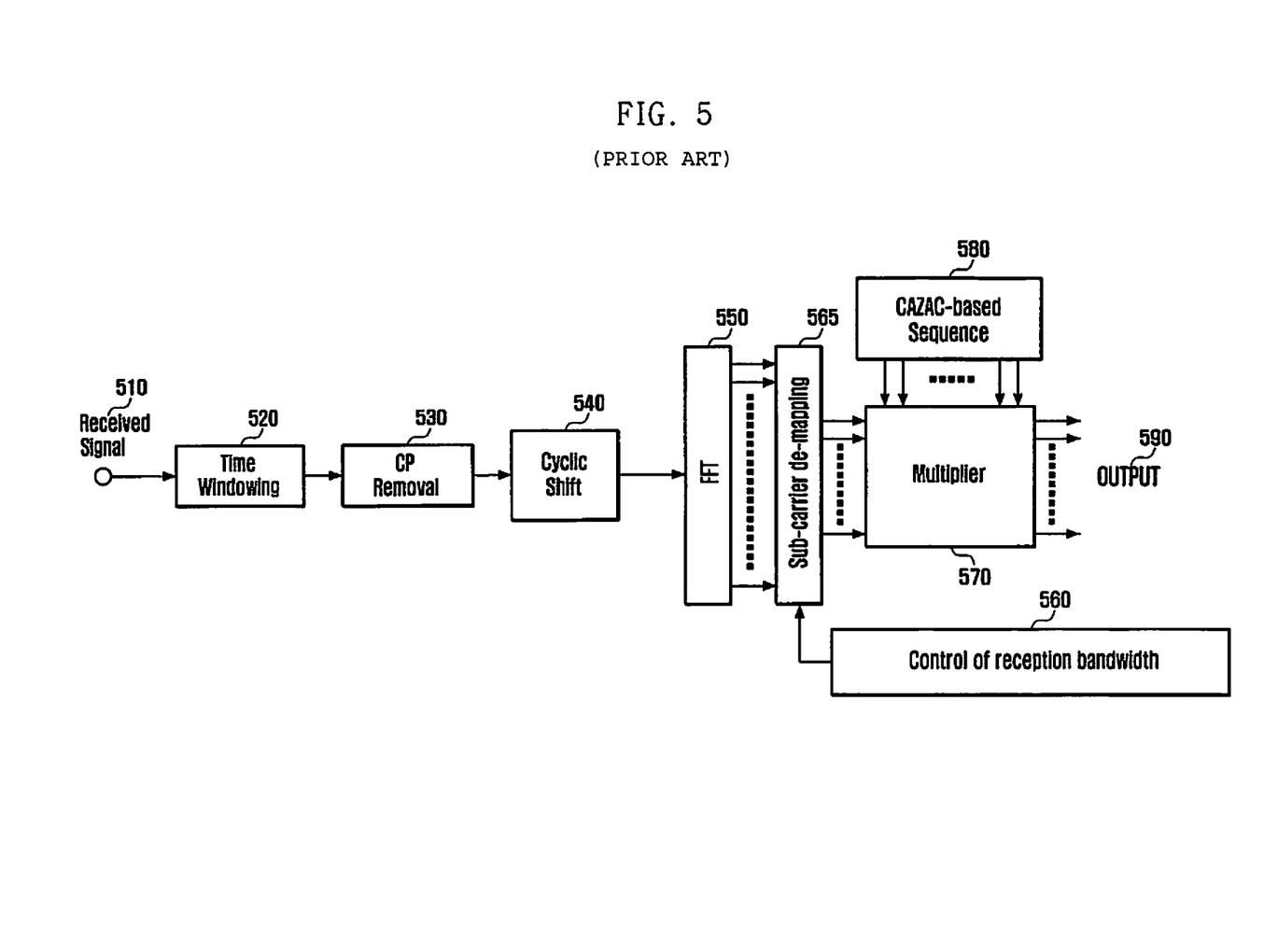
FIG. 5 is a block diagram illustrating a receiver structure for a CAZAC-based sequence.

The NodeB receiver performs the reverse functions of the UE transmitter. This is illustrated in FIG. 5 where the reverse operations of those in FIG. 4 are performed. In FIG. 5, an antenna receives the Radio-Frequency (RF) analog signal and after passing further processing units (such as filters, amplifiers, frequency down-converters, and analog-to-digital converters) the resulting digital received signal 510 passes through a time windowing unit 520 and the CP is removed 530. Subsequently, the CS of the transmitted CAZAC-based sequence is restored 540, a Fast Fourier Transform (FFT) 550 is applied, the selection 560 of the transmitted REs 565 is performed, and correlation 570 with the CAZAC-based sequence replica 580 is applied. The resulting output 590 can then be passed to a channel estimation unit, such as a time-frequency interpolator.

In addition to the DMRS transmission, the transmission from a UE of control signals or RS in the PUCCH and their reception by the NodeB may also be based on CAZAC sequences and be respectively performed as previously described.

Figure 6:
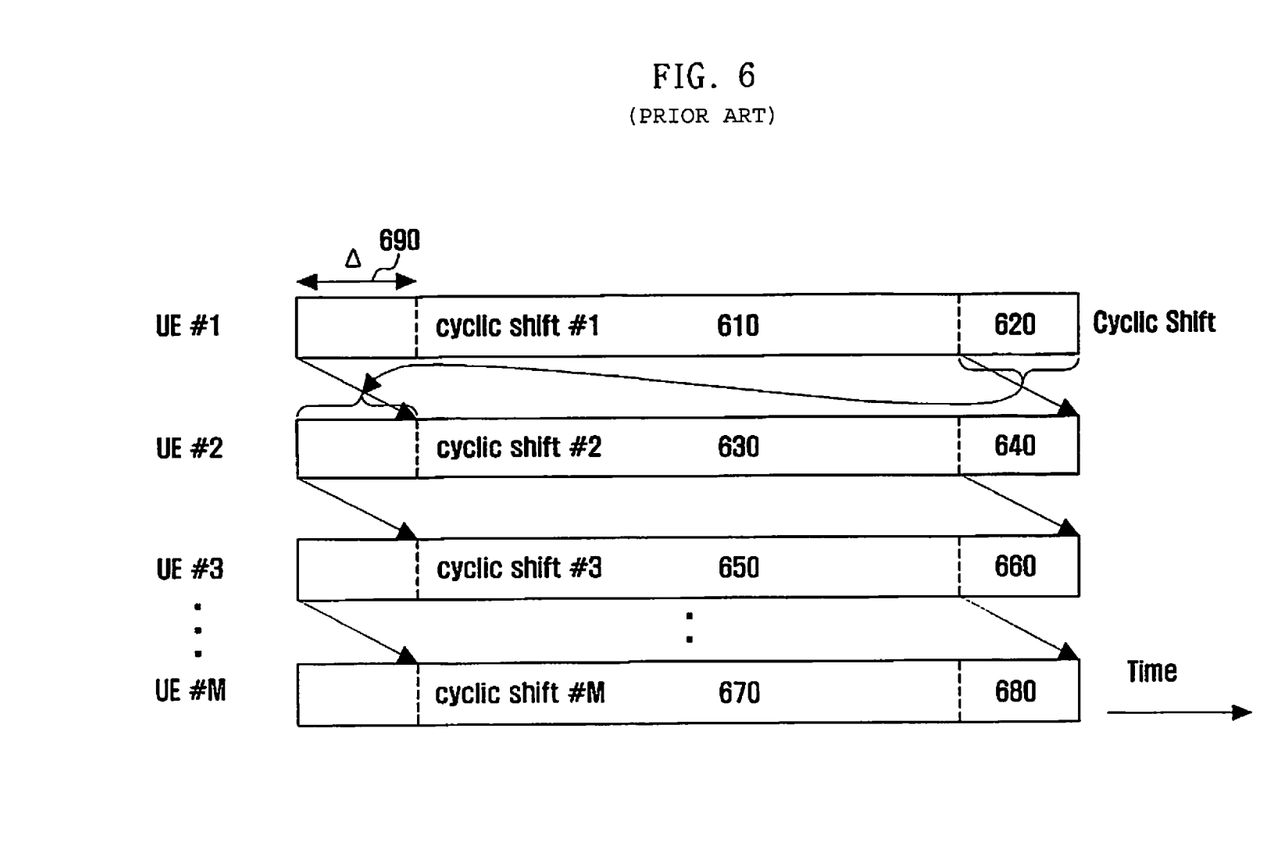
FIG. 6 is a diagram illustrating the orthogonal RS multiplexing using different cyclic shifts of a CAZAC sequence.

Different CSs of a CAZAC sequence provide orthogonal sequences. Therefore, for a given CAZAC sequence, different CSs can be allocated to different UEs and achieve orthogonal DMRS multiplexing in the same RBs. This principle is illustrated in FIG. 6. In order for the multiple CAZAC sequences 610, 630, 650, and 670 generated from multiple corresponding CSs 620, 640, 660, and 680 of the same CAZAC sequence to be orthogonal, the CS value 690 should exceed the channel propagation delay spread D (including a time uncertainty error and filter spillover effects). If $T_S$ is the duration of one sub-frame symbol, the number of CSs is equal to $\lfloor T_{s/D} \rfloor$ where $\lfloor \; \rfloor$ denotes the "floor" operation which rounds a number down to its lower integer.

For a PUSCH transmission associated with an UL SA, the UL SA is assumed to include a Cyclic Shift Indicator (CSI) indicating the CS for the CAZAC sequence used as DMRS. For SPS PUSCH transmissions, the NodeB also provides, through higher layer signaling, to the UE the CSI value. Table 1 shows a mapping of CSI values to CS values.

TABLE 1

Mapping of CSI Values to CS Values.

| CSI Value | CS Value |
|---|---|
| 000 | $CS_0 = 0$ |
| 001 | $CS_1 = 6$ |
| 010 | $CS_2 = 3$ |
| 011 | $CS_3 = 4$ |
| 100 | $CS_4 = 2$ |
| 101 | $CS_5 = 8$ |
| 110 | $CS_6 = 10$ |
| 111 | $CS_7 = 9$ |

Figure 7:
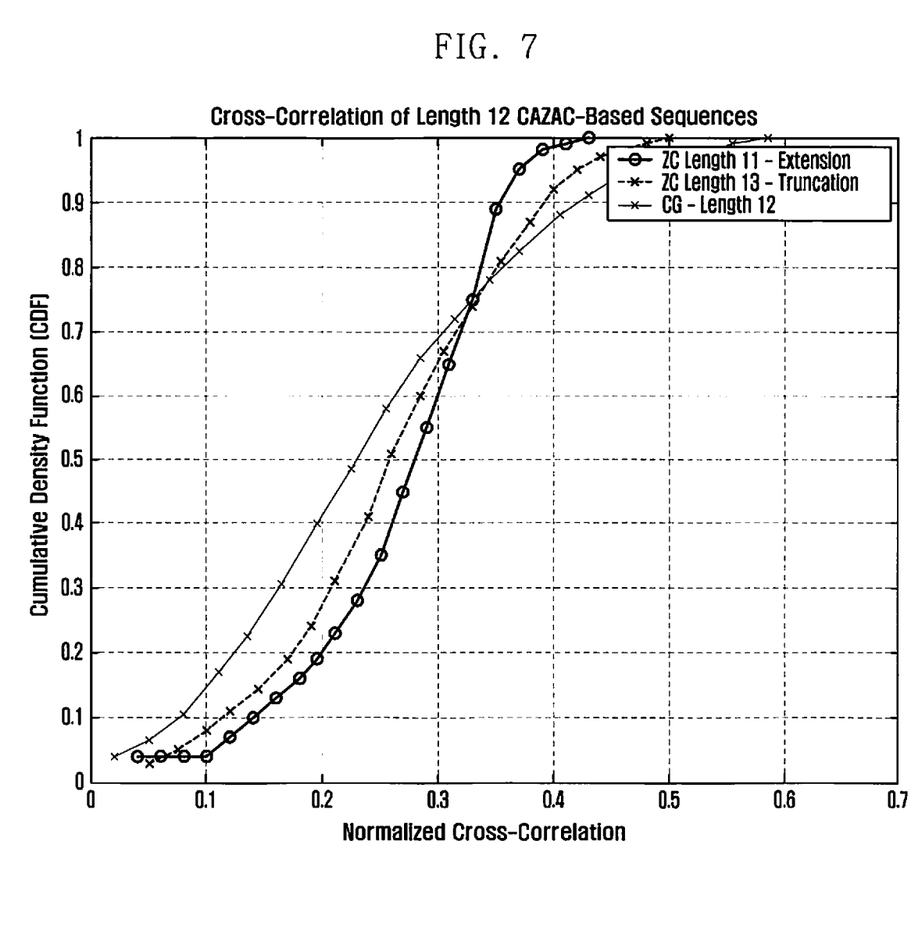
FIG. 7 is a diagram illustrating the Cumulative Density Function (CDF) of cross-correlation values for length-12 CAZAC-based sequences.

CAZAC-based sequences of the same length typically have low cross-correlations, which is important for minimizing mutual interference. CAZAC-based sequences of different lengths have a wide distribution of cross-correlation values and large values often occur. FIG. 7 shows the Cumulative Density Function (CDF) of cross-correlation values for length-12 CAZAC-based sequences resulting from cyclically extending a length-11 Zadoff-Chu (ZC) sequence, truncating a length-13 ZC sequence, or computer generation of length-12 CAZAC sequences. Variations in cross-correlation values are observed and even larger cross-correlation values may occur between CAZAC-based sequences of different lengths. Randomization of the occurrence of large cross-correlations can be achieved by sequence hopping where the sequence is selected from a predetermined set of sequences according to a hopping pattern such, as for example, a pseudo-random pattern having the slot number as one of its arguments.

Sequence hopping is among CAZAC-based sequences of the same length that belong either to the same group or to different groups. A group of CAZAC-based sequences consists of sequences with different lengths, each corresponding to each of the possible PUSCH RB allocations. For example, if 30 CAZAC-based sequences exist for the minimum allocation of 1 RB and since the number of available CAZAC-based sequences increases as the number of RBs increases, 30 sequence groups can always be generated. For large RB allocations, such as at least 6 RBs, 2 sequences can be included in each group of CAZAC-based sequences. Sequence hopping among sequences in different groups will be referred to as group sequence hopping while sequence hopping among sequences in the same group (for allocations of at least 6 RBs) will just be referred to as sequence hopping. Group sequence hopping and sequence hopping (within the same sequence group) are respectively enabled or disabled by the NodeB for all UEs in its cell and for all applicable signals using transmission of sequences (DMRS in the PUSCH or control signals and RS in the PUCCH) through broadcast signaling of the respective (cell-specific) parameters: Group-hopping-enabled and Sequence-hopping-enabled.

Multi-User Multiple-Input Multiple-Output (MU-MIMO) can improve the spectral efficiency of a communication system. With MU-MIMO, PUSCH transmissions from multiple UEs share at least part of a BW. MU-MIMO is facilitated if the NodeB can obtain interference-free estimates of the channel medium the MU-MIMO UEs experience. This requires orthogonal reception for the respective DMRS. If the PUSCH transmissions from MU-MIMO UEs share exactly the same BW, orthogonal DMRS multiplexing can be obtained using different CS of the same CAZAC sequence. However, if the PUSCH transmissions from MU-MIMO UEs do not share exactly the same BW, orthogonal DMRS multiplexing using different CS is not possible because the respective CAZAC-based sequences have different lengths. Orthogonal Covering Codes (OCC) can then be used to provide orthogonal DMRS multiplexing in the time domain. For the sub-frame structure in FIG. 1 which has 2 DMRS symbols, the OCCs can be {1, 1} and {1, −1}. Regarding the CS, the OCC should also be indicated for the DMRS transmission in the PUSCH.

Two classes of UEs are assumed to coexist in the communication system. The first class of UEs, referred to as legacy-UEs, do not support OCC and rely only on the CS for orthogonal DMRS multiplexing. The second class of UEs, referred to as Advanced-UEs, support OCC and can rely on both OCC and CS for orthogonal DMRS multiplexing.

A required restriction for the application of OCC is the absence of sequence hopping Because of the sub-frame structure in FIG. 1, time-domain orthogonality is not possible if the DMRS transmission in each sub-frame slot uses a different CAZAC sequence. Therefore, although OCC is only needed by Advanced-UEs for MU-MIMO transmissions over different BWs, the performance of all UEs is degraded by the requirement to disable sequence hopping over the entire cell. Moreover, as sequence planning to achieve low cross-correlations is typically impractical, PUCCH transmissions, which are assumed to rely entirely on CAZAC sequences, and occur over only one RB are particularly impacted which is highly undesirable given that control information has enhanced reliability requirements.

Therefore, there is a need to define a mapping of CSI values to OCC and CS values that optimizes DMRS multiplexing among Advanced-UEs and among legacy-UEs and Advanced-UEs.

There is also need to enable sequence hopping in a cell while supporting time-domain orthogonality through the application of OCC for the DMRS transmission in the PUSCH.

Finally, there is need to separate the application of sequence hopping between sequences used in PUSCH transmissions and sequences used in PUCCH transmissions.

SUMMARY OF THE INVENTION

Accordingly, the present invention has been designed to solve at least the aforementioned problems in the prior art and the present invention provides methods and an apparatus to support the configuration of the DMRS transmission parameters, through the application of a CS and an OCC, to disable sequence hopping for the DMRS in PUSCH transmissions from a UE when sequence hopping is enabled in the cell, and to separate the application of sequence hopping between PUSCH and the PUCCH.

In accordance with an aspect of the present invention, a method of a UE is provided for transmitting a reference signal. The method includes receiving a first parameter and a second parameter, which are cell specific parameters; receiving a third parameter, which is a UE specific parameter; acquiring a first reference signal for a physical uplink shared channel (PUSCH), based on the third parameter; acquiring a second reference signal for a physical uplink control channel (PUCCH), based on the first parameter; and transmitting at least one of the first reference signal and the second reference signal. Sequence hopping and group sequence hopping are disabled for the first reference signal, regardless of values of the first parameter and the second parameter, if the third parameter indicates that the sequence hopping and the group sequence hopping are disabled. The group sequence hopping is applied to acquire the second reference signal, if the first parameter indicates that the group sequence hopping is enabled and the third parameter indicates that the sequence hopping and the group sequence hopping are disabled. The sequence hopping includes hopping between two sequences in a group, and the group sequence hopping includes hopping among different groups.

In accordance with another aspect of the present invention, a method of a base station is provided for receiving a reference signal. The method includes transmitting a first parameter and a second parameter, which are cell specific parameters; transmitting a third parameter, which is a UE specific parameter; and receiving at least one of a first reference signal for a physical uplink shared channel (PUSCH) and a second reference signal for a physical uplink control channel (PUCCH). The first reference signal is generated by not applying sequence hopping and group sequence hopping, regardless of values of the first parameter and the second parameter, if the third parameter indicates that the sequence hopping and the group sequence hopping are disabled. The second reference signal is generated by applying the group sequence hopping, if the first parameter indicates that the group sequence hopping is enabled and the third parameter indicates that the sequence hopping and the group sequence hopping are disabled. The sequence hopping includes hopping between two sequences in a group, and the group sequence hopping includes hopping among different groups.

In accordance with another aspect of the present invention, a UE is provided for transmitting a reference signal. The UE includes a transceiver configured to transmit and receive signals; and a controller configured to control the transceiver to receive a first parameter and a second parameter, which are cell specific parameters, to control the transceiver to receive a third parameter, which is a UE specific parameter, to control to acquire a first reference signal for a physical uplink shared channel (PUSCH), based on the third parameter, to control to acquire a second reference signal for a physical uplink control channel (PUCCH), based on the first parameter, and to control the transceiver to transmit at least one of the first reference signal and second reference signal. Sequence hopping and group sequence hopping are disabled for the first reference signal, regardless of values of the first parameter and the second parameter, if the third parameter indicates that the sequence hopping and the group sequence hopping are disabled. The group sequence hopping is applied to acquire the second reference signal, if the first parameter indicates that the group sequence hopping is enabled and the third parameter indicates that the sequence hopping and the group sequence hopping are disabled. The sequence hopping includes hopping between two sequences in a group, and the group sequence hopping includes hopping among different groups.

In accordance with another aspect of the present invention, a base station is provided for receiving a reference signal. The base station includes a transceiver configured to transmit and receive signals; and a controller configured to control the transceiver to transmit a first parameter and a second parameter, which are cell specific parameters, transmit a third parameter, which is a UE specific parameter, and receive at least one of a first reference signal for a physical uplink shared channel (PUSCH) and a second reference signal for a physical uplink control channel (PUCCH). The first reference signal is generated by not applying sequence hopping and group sequence hopping, regardless of values of the first parameter and the second parameter, if the third parameter indicates that the sequence hopping and the group sequence hopping are disabled. The second reference signal is generated by applying the group sequence hopping, if the first parameter indicates that the group sequence hopping is enabled and the third parameter indicates that the sequence hopping and the group sequence hopping are disabled. The sequence hopping includes hopping between two sequences in a group, and the group sequence hopping includes hopping among different groups.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

The present invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described in relation to a Single-Carrier Frequency Division Multiple Access (SC-FDMA) communication system, it also applies to all Frequency Division Multiplexing (FDM) systems in general and to an Orthogonal Frequency Division Multiple Access (OFDMA), OFDM, FDMA, Discrete Fourier Transform (DFT)-spread OFDM, DFT-spread OFDMA, SC-OFDMA, and SC-OFDM system in particular.

The following two goals are considered:

a) Defining a mapping of CSI values to CS and OCC values, which optimizes DMRS multiplexing among Advanced-UEs and among legacy-UEs and Advanced-UEs.

b) Enabling sequence hopping in the PUSCH in conjunction with the application of OCC.

The first goal considers that the CSI value provides signaling support for orthogonal DMRS multiplexing among UEs also in the time domain by indicating a respective OCC value in addition to a CS value. The conventional CSI Information Element (IE) remains unchanged and no additional bits are introduced in the CSI IE to indicate that the OCC is being applied to the DMRS. Instead, the CSI value provides mapping to both the CS and the OCC values.

The CSI IE is assumed to consist of 3 bits and address a CS from a set of eight CS, $\{CS_0, CS_1, CS_2, CS_3, CS_4, CS_5, CS_6,$ and $CS_7\}$. For example, for a CAZAC-based sequence $\bar{r}(n)$ in the frequency domain, where n is the RE index, the DMRS sequence is $r^{(\alpha)}(n) = e^{j\alpha n}\bar{r}(n)$ where $\alpha$ is the CS given as $\alpha = 2\pi n_{CS}/12$ where $n_{CS} = (N_{DMRS} + n_{DMRS}) \bmod 12$ and $N_{DMRS}$ is a cell-specific values that is common to all UEs in a cell and $n_{DMRS}$ is determined from the CSI.

For legacy-UEs, the mapping in Table 1, and the goal of selecting CS values with the largest mutual distance in the time domain (modulo 12), the optimal CS values for various numbers of MU-MIMO legacy-UEs are:

a) 2 MU-MIMO legacy-UEs: $CS_0$ and $CS_1$
b) 3 MU-MIMO legacy-UEs: $CS_0$, $CS_3$ and $CS_5$
c) 4 MU-MIMO legacy-UEs: $CS_0$, $CS_1$, $CS_2$ and $CS_7$.

For more than 4 MU-MIMO legacy-UEs, the optimal CS values practically consist of the first 4 ones, CS0, CS1, CS2 and CS7, and any other additional values. Legacy-UEs are assumed to not support OCC for their DMRS transmission and therefore they have the implicit assignment of OCC {1, 1}. Since the communication system is assumed to support both legacy-UEs and Advanced-UEs, the OCC {1, 1} will be implicitly used by legacy-UEs and will not be as readily available to Advanced-UEs as the OCC {1, −1}. Rules for the CSI to OCC/CS mapping for Advanced-UEs will now be considered.

The first rule is that the CSI values indicating OCC {1, 1} should indicate different CS values for Advanced-UEs than for legacy-UEs in order to maximize MU-MIMO capacity among legacy-UEs and Advanced-UEs.

The second rule is that an equal number of CSs is associated with OCC {1, 1} and with OCC {1, −1}. For a CSI consisting of 3 bits indicating a total of 8 CS/OCC combinations, this implies that 4 CS values are associated with OCC {1, 1} and 4 CS values are associated with OCC {1, −1}.

The third rule is that different CSs associate with OCC {1, 1} and with OCC {1, −1}. Then, DMRS orthogonal multiplexing is achieved both through OCC and through CS, which enhances its robustness against temporal channel variations or large channel propagation delays.

The fourth rule is that CS values associated with OCC {1, 1} have maximum mutual distance and CS values associated with OCC {1, −1} also have maximum mutual distance.

The above rules also allow the NodeB to arbitrarily select any CSI value while ensuring a robust mapping of the CSI values to CS and OCC values. This is important because the CSI may also be used to indicate the resource for the corresponding HARQ-ACK signal transmission from the NodeB (in response to the reception by the NodeB of the PUSCH transmission by the UE in case it is scheduled by the UL SA containing the CSI).

Table 2 shows the mapping of the CSI values to the CS and OCC values used for the DMRS transmission by Advanced-UEs in accordance with the previously described rules.

TABLE 2

First Mapping of CSI Values to CS
and OCC Values—Advanced-UEs.

| CSI Value | CS Value | OCC Value |
|---|---|---|
| 000 | 2 | {1, −1} |
| 001 | 8 | {1, −1} |
| 010 | 5 | {1, −1} |
| 011 | 1 | {1, 1} |
| 100 | 7 | {1, 1} |
| 101 | 4 | {1, 1} |
| 110 | 10 | {1, 1} |
| 111 | 11 | {1, −1} |

The mapping in Table 3 also satisfies the CSI to CS-and-OCC mapping rules. Relative to the mapping in Table 2, the only difference is that the association between CS values and OCC values is reversed.

TABLE 3

Second Mapping of CSI Value to
CS and OCC Values—Advanced-UEs.

| CSI Value | CS Value | OCC Value |
|---|---|---|
| 000 | 1 | {1, −1} |
| 001 | 7 | {1, −1} |
| 010 | 4 | {1, −1} |
| 011 | 2 | {1, 1} |
| 100 | 8 | {1, 1} |
| 101 | 5 | {1, 1} |
| 110 | 11 | {1, 1} |
| 111 | 10 | {1, −1} |

In principle, the association of a specific CSI value with a pair of CS and OCC values can be arbitrary and not confined to ones in Table 2 or Table 3. For example, an alternative association may be used such as Table 4 or Table 5 below. This is because the previously described rules consider only the association between CS and OCC values for Advanced-UEs and their relation to the CS values for legacy-UEs. In this respect, the CSI value associated with a CS/OCC pair is immaterial. Nevertheless, the association of a CSI value with a pair of CS and OCC values in Table 2 or Table 3 is beneficial.

TABLE 4

Third Mapping of CSI Value to CS
and OCC Values—Advanced-UEs.

| CSI Value | CS Value | OCC Value |
|---|---|---|
| 000 | 2 | {1, −1} |
| 001 | 8 | {1, −1} |
| 010 | 5 | {1, −1} |
| 011 | 11 | {1, −1} |
| 100 | 1 | {1, 1} |
| 101 | 7 | {1, 1} |
| 110 | 4 | {1, 1} |
| 111 | 10 | {1, 1} |

TABLE 5

Fourth Mapping of CSI Value to CS
and OCC Values—Advanced-UEs.

| CSI Value | CS Value | OCC Value |
|---|---|---|
| 000 | 5 | {1, −1} |
| 001 | 11 | {1, −1} |
| 010 | 8 | {1, −1} |
| 011 | 1 | {1, 1} |
| 100 | 7 | {1, 1} |
| 101 | 4 | {1, 1} |
| 110 | 10 | {1, 1} |
| 111 | 2 | {1, −1} |

The second goal considers enabling DMRS sequence hopping in conjunction with the application of OCC in the PUSCH. DMRS sequence hopping needs to be disabled in case of MU-MIMO among UEs having PUSCH transmission with different bandwidths in order to allow for orthogonal DMRS multiplexing relying on different OCCs.

Since the Node B can control whether sequence hopping (either across groups of sequences or within a group of sequences) is applied to its cell and can control whether MU-MIMO transmissions are over different PUSCH bandwidths, it can select between these two features (sequence hopping or MU-MIMO over different PUSCH bandwidths). If the (cell-specific) "group-hopping-enabled" and the "sequence-hopping-enabled" parameters indicate that sequence hopping is disabled in the cell served by the NodeB, the mapping of CSI values to OCC/CS values can be, for example, as in Table 2, Table 3, Table 4, or Table 5. If the "group-hopping-enabled" or the "sequence-hopping-enabled" parameter indicates that sequence hopping is enabled in the cell, the CSI mapping to CS values for Advanced-UEs can be as in Table 1.

Figure 8:
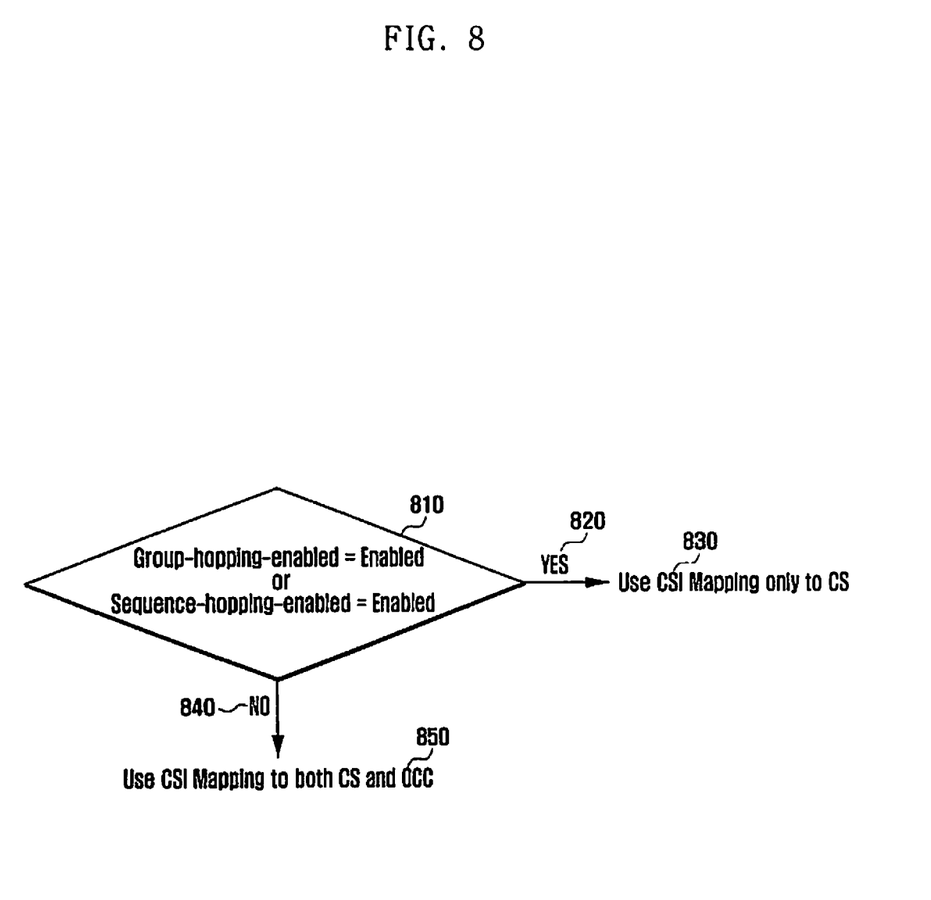
FIG. 8 is a diagram illustrating the interpretation of the mapping of CSI values to CS and OCC values depending on the use of group sequence hopping or sequence hopping within a group.

FIG. 8 illustrates the interpretation by an Advanced-UE of the mapping from the CSI values to CS and OCC values. If the NodeB indicates 810 that either group sequence hopping or sequence hopping within a group is enabled 820, an Advanced-UE assumes that the CSI indicates only CS values 830, for example using the mapping in Table 1. Otherwise 840, an Advanced-UE assumes that the CSI indicates both CS and OCC values 850, for example using the mapping in Table 2.

Alternatively, a new (UE-specific) parameter "OCC-enabled" can be defined for Advanced-UEs in order to separate the application of sequence hopping among legacy-UEs and Advanced-UEs. The "OCC-enabled" parameter is signaled through RRC to the Advanced-UE and indicates whether sequence hopping is enabled or not (and may also interpret the CSI as mapping to both CS and OCC values or as mapping only to CS values) when the NodeB already indicates (through cell-specific signaling) that sequence hopping is enabled in its cell. In the first case, the Advanced-UE follows the indication of the "group-hopping-enabled" and "sequence-hopping-enabled" parameters by the NodeB regarding sequence hopping. In the second case, the Advanced-UE disables both group sequence hopping and sequence hopping within a group even when the (cell-specific) "group-hopping-enabled" and "sequence-hopping-enabled" parameters indicate that sequence hopping is enabled.

Figure 9:
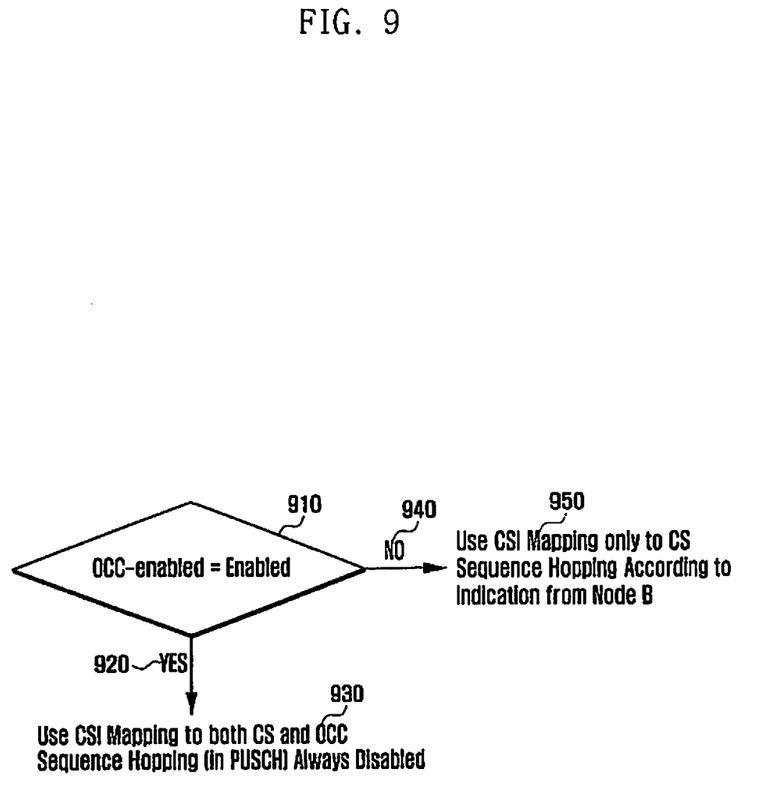
FIG. 9 is a diagram illustrating the application of sequence hopping depending on the "OCC-enabled" parameter value the NodeB informs the UE through RRC signaling.

FIG. 9 illustrates the mapping of CSI values to CS and OCC values and the application of sequence hopping by an Advanced-UE depending on the value of the "OCC-enabled" parameter signaled by the NodeB. An Advanced-UE evaluates whether "OCC-enabled=Enabled" 910 and if the NodeB indicates that it is enabled 920 (implying sequence hopping is disabled), the Advanced-UE may assume that the CSI value indicates both a CS value and an OCC value 930, using, for example, the mapping in Table 2, and the Advanced-UE does not apply sequence hopping to its DMRS transmission regardless of the respective (cell-specific) NodeB indication for sequence hopping. Otherwise, if OCC-Enabled is not enabled 940, the Advanced-UE may assume that the CSI value indicates only CS values, using, for example, the mapping in Table 1, and follows the (cell-specific) NodeB indication regarding sequence hopping for its DMRS transmission 950.

Since signal transmissions in the PUCCH are assumed to occur in one RB, only group sequence hopping can apply for the respective CAZAC-based sequences (which, in addition to DMRS, may include HARQ-ACK signals or CQI signals). As the restrictions regarding sequence hopping from the introduction of OCC do not occur in the PUCCH, an Advanced-UE is assumed to always follow the (cell-specific) indication of the "group-hopping-enabled" parameter by the NodeB regardless of the (UE-specific) indication for sequence hopping and application of OCC for the DMRS transmission in the PUSCH (through the UE-specific "OCC-enabled" parameter).

Figure 10:
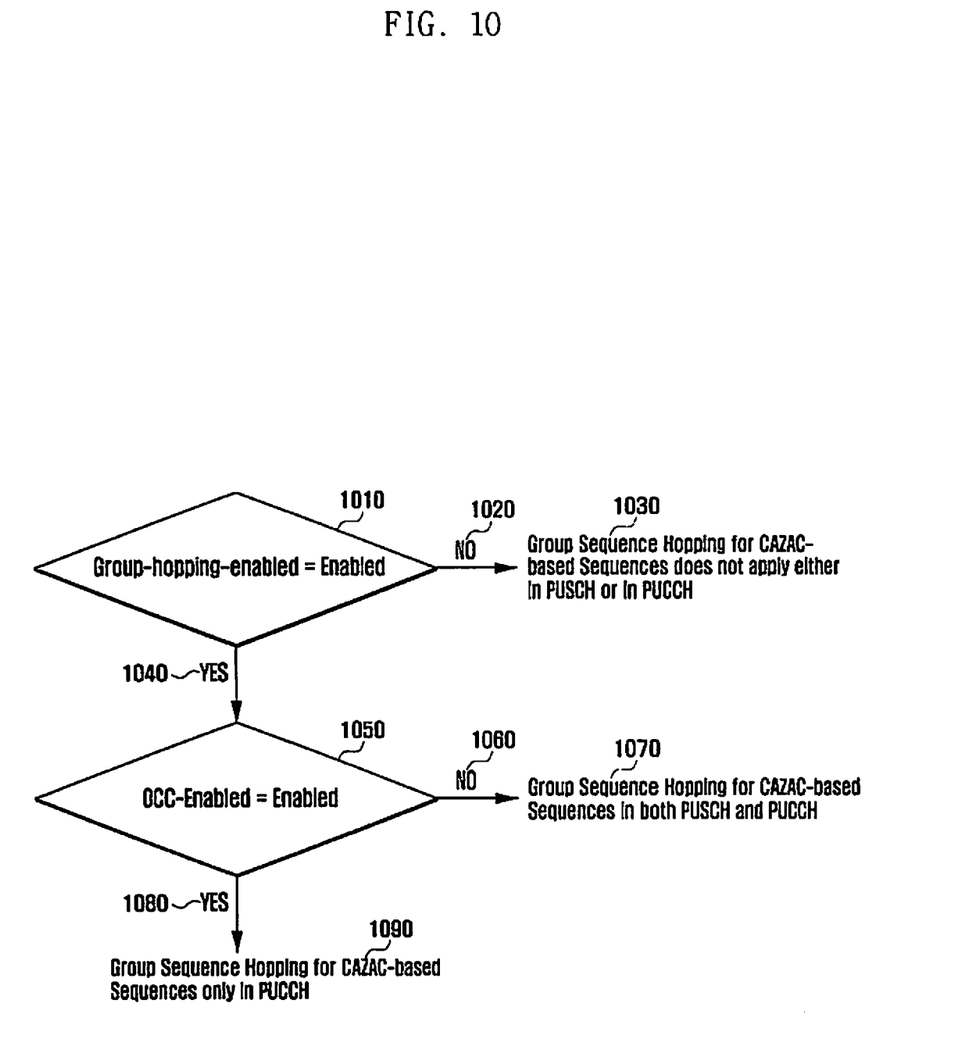
FIG. 10 is a diagram illustrating the different applicability of sequence hopping in the PUSCH and in the PUCCH depending on the "OCC-enabled" parameter and the cell-specific enabling of sequence hopping.

FIG. 10 illustrates the different applicability of the cell-specific "group-hopping-enabled" parameter for CAZAC-based sequence hopping in the PUSCH and in the PUCCH depending on the "OCC-enabled" parameter. If the "group-hopping-enabled" parameter 1010 indicates that group hopping for CAZAC-based sequence is not enabled 1020, group sequence hopping of CAZAC-based sequences does not apply either in the PUSCH or in the PUCCH 1030. If the "group-hopping-enabled" parameter indicates that group hopping for CAZAC-based sequence is enabled 1040, then group hopping of CAZAC-based sequences in the PUSCH depends on the "OCC-enabled" parameter 1050. If the "OCC-enabled" parameter is not set 1060, group sequence hopping of CAZAC-based sequences applies to both PUSCH and PUCCH 1070. If the "OCC-enabled" parameter is set 1080, group sequence hopping of CAZAC-based sequences applies only to PUCCH 1090.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of a user equipment (UE) for transmitting a reference signal, the method comprising:
  receiving a first parameter and a second parameter, which are cell specific parameters;
  receiving a third parameter, which is a UE specific parameter;
  acquiring a first reference signal for a physical uplink shared channel (PUSCH), based on the third parameter;
  acquiring a second reference signal for a physical uplink control channel (PUCCH), based on the first parameter; and
  transmitting at least one of the first reference signal and the second reference signal,
  wherein sequence hopping and group sequence hopping are disabled for the first reference signal, for orthogonal reference signal multiplexing, regardless of values of the first parameter and the second parameter, if the third parameter indicates that the sequence hopping and the group sequence hopping are disabled,
  wherein the group sequence hopping is applied to acquire the second reference signal, if the first parameter indicates that the group sequence hopping is enabled and the third parameter indicates that the sequence hopping and the group sequence hopping are disabled,
  wherein the sequence hopping includes hopping between two sequences in a group, and
  wherein the group sequence hopping includes hopping among different groups.

2. The method of claim 1, wherein the first parameter, the second parameter, and the third parameter are received on higher layer signaling.

3. The method of claim 1, wherein the first reference signal is a demodulation reference signal used for demodulation of uplink data, and
  wherein the second reference signal is a demodulation reference signal used for demodulation of uplink control information.

4. The method of claim 1, further comprising receiving a cyclic shift indicator (CSI) indicating a cyclic shift for a sequence and an orthogonal covering code,
  wherein the first reference signal is acquired based on the CSI.

5. A method of a base station for receiving a reference signal, the method comprising:
  transmitting a first parameter and a second parameter, which are cell specific parameters;
  transmitting a third parameter, which is a UE specific parameter; and
  receiving at least one of a first reference signal for a physical uplink shared channel (PUSCH) and a second reference signal for a physical uplink control channel (PUCCH),
  wherein the first reference signal is generated by not applying sequence hopping and group sequence hopping, regardless of values of the first parameter and the second parameter, for orthogonal reference signal multiplexing, if the third parameter indicates that the sequence hopping and the group sequence hopping are disabled,
  wherein the second reference signal is generated by applying the group sequence hopping, if the first parameter indicates that the group sequence hopping is enabled and the third parameter indicates that the sequence hopping and the group sequence hopping are disabled,
  wherein the sequence hopping includes hopping between two sequences in a group, and
  wherein the group sequence hopping includes hopping among different groups.

6. The method of claim 5, wherein the first parameter, the second parameter, and the third parameter are received on higher layer signaling.

7. The method of claim 5, wherein the first reference signal is a demodulation reference signal used for demodulation of uplink data, and
  wherein the second reference signal is a demodulation reference signal used for demodulation of uplink control information.

8. The method of claim 5, further comprising transmitting a cyclic shift indicator (CSI) indicating a cyclic shift for a sequence and an orthogonal covering code,
  wherein the first reference signal is generated based on the CSI.

9. A User Equipment (UE) for transmitting a reference signal, the UE comprising:
  a transceiver configured to transmit and receive signals; and a controller configured to control the transceiver to receive a first parameter and a second parameter, which are cell specific parameters, to control the transceiver to receive a third parameter, which is a UE specific parameter, to control to acquire a first reference signal for a physical uplink shared channel (PUSCH), based on the third parameter, to control to acquire a second reference signal for a physical uplink control channel (PUCCH), based on the first parameter, and to control the transceiver to transmit at least one of the first reference signal and second reference signal,
wherein sequence hopping and group sequence hopping are disabled for the first reference signal, for orthogonal reference signal multiplexing, regardless of values of the first parameter and the second parameter, if the third parameter indicates that the sequence hopping and the group sequence hopping are disabled,
wherein the group sequence hopping is applied to acquire the second reference signal, if the first parameter indicates that the group sequence hopping is enabled and the third parameter indicates that the sequence hopping and the group sequence hopping are disabled,
wherein the sequence hopping includes hopping between two sequences in a group, and
wherein the group sequence hopping includes hopping among different groups.

10. The UE of claim 9, wherein the first parameter, the second parameter, and the third parameter are received on higher layer signaling.

11. The UE of claim 9, wherein the first reference signal is a demodulation reference signal used for demodulation of uplink data, and
wherein the second reference signal is a demodulation reference signal used for demodulation of uplink control information.

12. The UE of claim 9, wherein the controller is further configured to control the transceiver to receive a cyclic shift indicator (CSI) indicating a cyclic shift for a sequence and an orthogonal covering code, and
wherein the first reference signal is acquired based on the CSI.

13. A base station for receiving a reference signal, the base station comprising:
a transceiver configured to transmit and receive signals; and
a controller configured to control the transceiver to transmit a first parameter and a second parameter, which are cell specific parameters, transmit a third parameter, which is a UE specific parameter, and receive at least one of a first reference signal for a physical uplink shared channel (PUSCH) and a second reference signal for a physical uplink control channel (PUCCH),
wherein the first reference signal is generated by not applying sequence hopping and group sequence hopping, for orthogonal reference signal multiplexing, regardless of values of the first parameter and the second parameter, if the third parameter indicates that the sequence hopping and the group sequence hopping are disabled,
wherein the second reference signal is generated by applying the group sequence hopping, if the first parameter indicates that the group sequence hopping is enabled and the third parameter indicates that the sequence hopping and the group sequence hopping are disabled,
wherein the sequence hopping includes hopping between two sequences in a group, and
wherein the group sequence hopping includes hopping among different groups.

14. The base station of claim 13, wherein the first parameter, the second parameter, and the third parameter are received on higher layer signaling.

15. The base station of claim 13, wherein the first reference signal is a demodulation reference signal used for demodulation of uplink data, and
wherein the second reference signal is a demodulation reference signal used for demodulation of uplink control information.

16. The base station of claim 13, wherein the controller is further configured to control the transceiver to transmit a cyclic shift indicator (CSI) indicating a cyclic shift for a sequence and an orthogonal covering code, and
wherein the first reference signal is generated based on the CSI.

* * * * *